United States Patent
Schmidt (10) Patent No.: US 6,523,059 B1
(45) Date of Patent: Feb. 18, 2003

(54) SYSTEM AND METHOD FOR FACILITATING SAFEPOINT SYNCHRONIZATION IN A MULTITHREADED COMPUTER SYSTEM

(75) Inventor: Rene W. Schmidt, Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/206,810

(22) Filed: Dec. 7, 1998

(51) Int. Cl.⁷ .................................. G06F 9/40
(52) U.S. Cl. ...................... 709/100; 707/206
(58) Field of Search ................... 709/107–108, 709/106, 100; 707/206

(56) References Cited

U.S. PATENT DOCUMENTS

| | | | | |
|---|---|---|---|---|
| 5,842,016 A | * | 11/1998 | Toutonghi | 709/106 |
| 6,026,428 A | * | 2/2000 | Hutchison | 709/108 |
| 6,167,423 A | * | 12/2000 | Chopra | 709/100 |

OTHER PUBLICATIONS

Franklyn Turbak, "First–Class Synchronization Barriers," 1996, ACM Press, p. 157–168.*

* cited by examiner

*Primary Examiner*—Alvin Oberley
*Assistant Examiner*—Li Zhen
(74) *Attorney, Agent, or Firm*—Beyer Weaver & Thomas LLP (57) ABSTRACT

Methods and apparatus for facilitating a global safepoint operation in a multithreaded computer system are disclosed. According to one aspect of the present invention, each thread keeps track of its safepoint regions by maintaining a variable which indicates a state, such as whether the current region of the thread is safe, unsafe, or transitional. In this manner, it can be determined whether a thread is currently in a safepoint region without suspending the thread. When a thread is currently in a safepoint region, the thread can continue to operate while a global safepoint operation, such as garbage-collection is being performed. When the thread begins to transition out of the safe region, it moves into a transitional region. The transitional region automatically blocks the transition into the non-safe region to assure that the safepoint operation occurs in a safe region.

23 Claims, 10 Drawing Sheets

SYSTEM AND METHOD FOR FACILITATING SAFEPOINT SYNCHRONIZATION IN A MULTITHREADED COMPUTER SYSTEM

BACKGROUND OF THE INVENTION

The present invention relates generally to the facilitation of a global safepoint operation in a multithreaded computer system environment. More particularly, the present invention relates to facilitating a global safepoint operation while avoiding suspending all threads during safepoint synchronization.

In computer science, the term "multitasking" is often used to refer to an operating system's ability to support multiple processes simultaneously. A process, as will be appreciated by those skilled in the art, is often a program that is being executed. Support for multiple processes is necessary in applications where several computations proceed in parallel, i.e., substantially simultaneously. In time-sharing systems, multiple users share a single computer system and all processes created by the users should, at least in principle, potentially execute simultaneously. Real time systems that control multiple devices also need to support multiple processes. For instance, an avionics computer on board an airplane runs processes for monitoring the engines, updating the flight instruments, processing radar signals, and keeping the airplane on course. Batch operating systems depend on multitasking for overlapping computation with input/output (I/O) operations. For instance, when a process performs I/O, the operating system may run another process to avoid idling the central processor for long periods of time.

One type of process is known as a primitive process, or a thread. A single process may also include multiple threads. Typically, the simplest way to execute multiple threads simultaneously is to assign each thread to its own processor in a multiprocessor system. If the number of threads exceeds the number of processors, then processors must typically be multiplexed among the threads. By switching a processor rapidly from one thread to the next, it appears to the observer as if all threads are making progress, even if the processor can execute only one instruction at a time. While processor multiplexing typically implements only quasi-parallelism, peripheral devices may provide true parallelism even if the computer system contains only a single, central processor. Many peripheral devices may be regarded as specialized processors that operate concurrently with the central processor. A device runs a single process specialized, for example, for printing a line or writing a disk block. The device generally receives commands from a device driver process that itself runs on the central processor. After a device driver has issued a command to a device, the device driver waits for a completion signal. During this wait, the main processor typically switches its attention from the device driver to other threads.

While maintaining multiple threads, the computer system may need to perform global operations which require synchronization, or control of all or a group of threads at a given time. An example of such a global operation is garbage collection. As will be appreciated by those skilled in the art, garbage collection is a method which allows memory storage associated with objects which are no longer alive to be automatically reclaimed.

Many programming languages and systems provide for dynamic as well as static allocation of memory storage to abstract data objects. The performance of these systems relies on their ability to reclaim and reuse storage for dynamically allocated objects after the dynamically allocated objects are no longer needed by the executed program. Some language systems require programmers to return unneeded objects to the memory system explicitly. Although this explicit return of memory permits precise and efficient recycling of storage when performed carefully, it often results in objects being recycled prematurely or being forgotten and thus lost to the system. Other systems reclaim abandoned objects automatically through a process such as "garbage collection." Reclaiming storage automatically in this way is both a convenience to the programmer and a means for insuring that every object's storage is recycled correctly.

Garbage collection typically occurs in two phases. A first phase typically involves identifying unneeded objects, while a second phase renders the storage associated with the unneeded objects available for reallocation. An object in a program is needed, or live, at a given time if the program might access the object in the future. When an object is such that no program will access it in the future, the object is considered to be dead. In practice, garbage collection algorithms, or "garbage collectors," typically consider an object to be dead only if the program has abandoned all pointers to it, making future access impossible.

For a global operation, such as garbage collection, all the locations of objects and all locations of reference pointers typically need to be known to perform such a global operation. In a multithreaded environment, a "stop" instruction is typically sent to all threads prior to performing a global operation. Once a stop instruction is sent to all threads, it needs to be determined whether each thread is in a "safe" region or an "unsafe" region. A safe region is typically a region of code through which a thread is processing, and in which pointers are not being manipulated. An unsafe region is a region of the code through which a thread is processing, and in which pointers may be manipulated. Conventionally, all threads are typically suspended ("thread suspends") in order to evaluate each thread and determine if each thread is in a safe or unsafe region. If a thread is in an unsafe region, then the thread operation is resumed and is stopped later to attempt to suspend it at a safe region.

Although thread suspends can be effective in some systems, typically, the more concurrent threads that are in use at any given time, the slower the thread suspend progresses. Accordingly, suspend processes may be very expensive to perform on many of today's advanced processors which support many concurrent threads, due to the fact that the speed associated with a system may be significantly compromised. Additionally, many threads are in a situation such that they may not need to be suspended. For example, when a thread is in a safe region, then that particular thread causes no problems for the performance of a global safepoint operation. However, conventionally, all the threads are suspended in order to evaluate and determine whether each thread is in a safe or unsafe region.

Therefore, what is desired is a relatively inexpensive method and apparatus for performing a global safepoint operation. Specifically, what is needed is a method and an apparatus for facilitating a global safepoint operation, without the need to suspend all threads, e.g., without the need to suspend threads which are in a safe region.

SUMMARY OF THE INVENTION

The present invention relates to a system and a method for facilitating a global safepoint operation in a multithreaded computer system. According to one aspect of the present invention, each thread keeps track of its safepoint regions by maintaining a variable which indicates a state, such as whether the current region of the thread is safe, unsafe, or transitional. In this manner, it can be determined whether a thread is currently in a safepoint region without suspending the thread. When a thread is currently in a safepoint region, the thread can continue to operate while a global safepoint operation, such as garbage-collection, is being performed. When the thread begins to transition out of the safe region, it moves into a transitional region. The transitional region automatically blocks the transition into the non-safe region to assure that the safepoint operation occurs in a safe region.

In one embodiment, one thread may begin a safepoint procedure after it acquires a safepoint lock. The safepoint lock blocks other threads from attempting to perform the safepoint procedure at the same time. Prior to initiating a safepoint operation, the thread attempting to initiate the safepoint operation will wait until all other threads reach a safe region in each of their own code.

In accordance with another aspect of the present invention, a method for facilitating a safepoint operation in a multi-threaded computer system is presented. A first thread acquires a safepoint, and a determination is made as to whether at least one of the remaining threads is in a safe region that requires the suspension of all of the threads. A safepoint operation is then initiated.

In still another aspect of the invention, a method for facilitating a safepoint operation in a computer system including at least one thread is also presented. The method includes determining whether a thread is in a safe region. Such a determination is made without suspending the thread. Thread operation is allowed to continue if the thread is in the safe region, and a safepoint operation is initiated while the thread is continuing to operate.

In yet another aspect of the invention, a method according to an embodiment of the present invention for facilitating a safepoint operation in a computer system including at least one thread involves providing a state associated with a thread and determining if the state indicates a transition. When the state indicates a predetermined type of transition and if a safepoint operation has been initiated, the operation of the thread is blocked.

According to still another aspect of the invention, a system for facilitating a safepoint operation in a computer system including at least one thread is also presented. A system includes a variable that is arranged to indicate whether a thread in operation is in a safe region, and a processor configured to read that variable. The processor is further configured to determine if the thread is in a safe region without suspending the thread, as well as being configured to initiate a safepoint operation if the thread is in a safe region.

The present invention will be more readily understood upon reading the following detailed descriptions and studying the various figures of the drawings.

BRIEF DESCRIPTION OF THE DRAWINGS

The present invention may be understood by reference to the following description taken in conjunction with the accompanying drawings in which.

The following description is presented to enable one of ordinary skill in the art to make and to use the invention and is provided in the context of a patent application and its requirements. Various modifications to the disclosed embodiments will be readily apparent to those skilled in the art and the generic principles herein may be applied to other embodiments. Thus, the present invention is not intended to be limited to the embodiments as shown but is to be accorded the widest scope consistent with the principles and features described herein.

Figure 1:
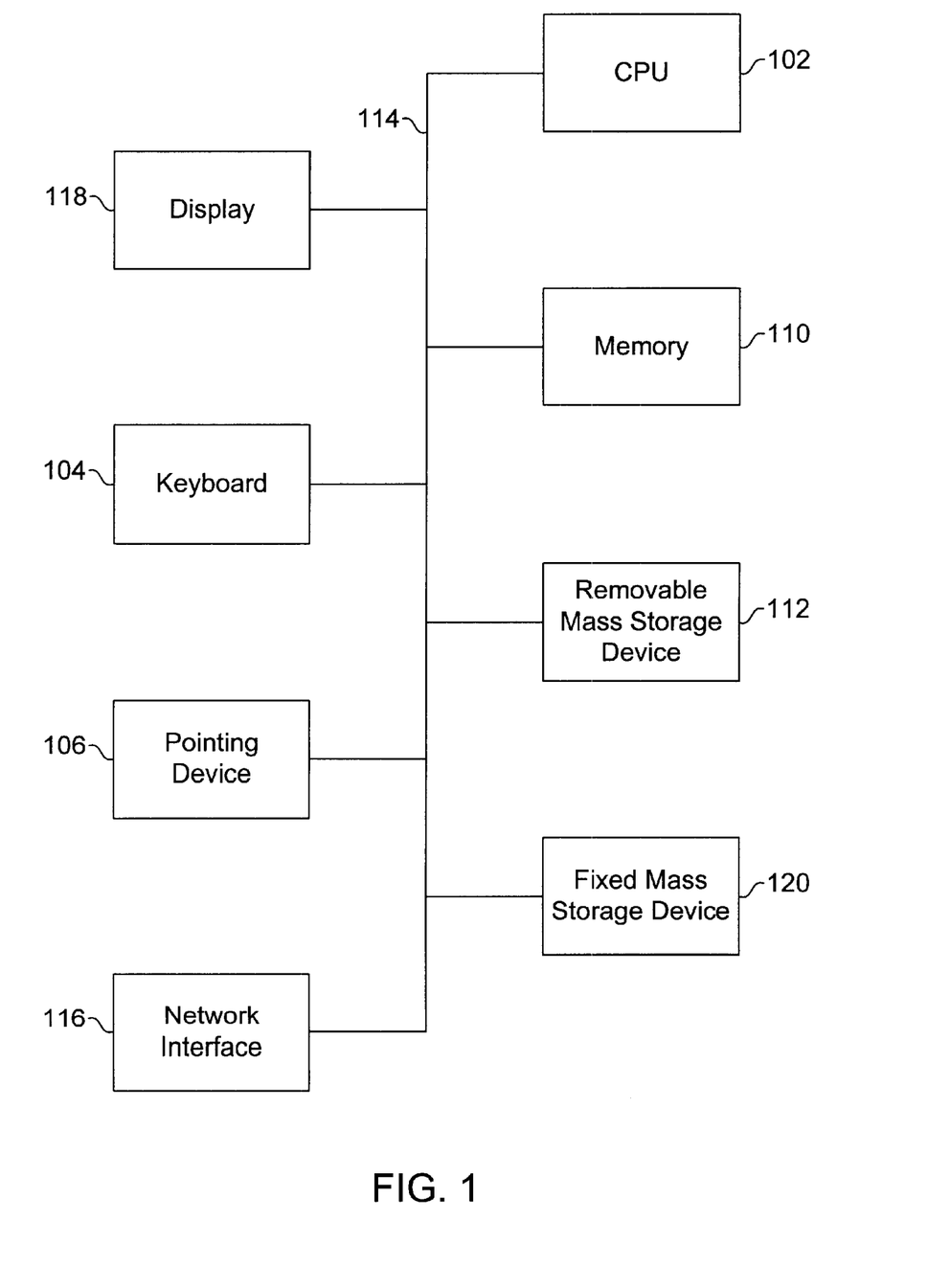
FIG. 1 is a block diagram of a computer system suitable for implementing the present invention.

FIG. 1 is a block diagram of a general purpose computer system 100 that is suitable for carrying out the processing in accordance with one embodiment of the present invention. In general, it should be understood that many other computer system architectures and configurations may be used for carrying out the processing of the present invention. Computer system 100, made up of various subsystems as will be described below, includes at least one processor subsystem (also referred to as a central processing unit, or CPU) 102. That is, CPU 102 may either be implemented by a single-chip processor, or by multiple processors. CPU 102 is a general purpose digital processor which controls the operation of the computer system 100. Using instructions retrieved from a memory 110, CPU 102 controls the reception and manipulation of input data, and the output and display of data on output devices such as a display monitor 118.

CPU 102 is coupled bi-directionally with memory 10 which can include a first primary storage area, typically a random access memory (RAM), and a second primary storage area, typically a read-only memory (ROM). As is well known in the art, primary storage may be used as a general storage area and as scratch-pad memory. In addition, primary storage may also be used to store input data and processed data, as well as programming instructions and data, in the form of data objects and text objects. Further, other data and instructions for processes operating on CPU 102 may be stored in primary storage. That is, as well known in the art, primary storage typically includes basic operating instructions, program code, data, and objects used by CPU 102 to perform its functions. In general, memory 110, e.g., primary storage devices, may include any suitable computer-readable storage media, as will be described below, depending on whether, for example, data access needs to be bi-directional or uni-directional. CPU 102 may also directly, as well as very rapidly, retrieve and store frequently needed data in a cache memory (not shown).

A removable mass storage device 112 provides additional data storage capacity for computer system 100, and is coupled either bi-directionally or unidirectionally to CPU 102. For example, a specific removable mass storage device 112 commonly known as a CD-ROM typically passes data uni-directionally to CPU 102, whereas a floppy disk may pass data bi-directionally to CPU 102. Removable mass storage device 112 may also include computer-readable media such as magnetic tape, flash memory, signals embodied on a carrier wave, PC-CARDS, portable mass storage devices, holographic storage devices, and other storage devices. A fixed mass storage 120 may also provide additional data storage capacity. The most common example of mass storage 120 is a hard disk drive. Mass storage 112, 120 generally store additional programming instructions, data, and the like that typically are not in active use by CPU 102. It will be appreciated that the information retained within mass storage 112, 120 may be incorporated, if needed, in standard fashion as part of primary storage 110 (e.g., RAM) as virtual memory.

A bus 114 is arranged to provide CPU 102 access to storage subsystems such as memory 110, removable mass storage device 112, and fixed mass storage device 120. In addition to providing CPU 102 access to storage subsystems, bus 114 may generally be used to provide access to other subsystems and devices as well. In the described embodiment, these subsystems and devices may include display monitor 118, a network interface 116, a keyboard 104, and a pointing device 106, as well as an auxiliary input/output device interface, a sound card, speakers, and other subsystems as needed. Pointing device 106 may be a mouse, stylus, track ball, or tablet, and is usefull for interacting with a graphical user interface.

Network interface 116 allows CPU 102 to be coupled to another computer, computer network, or telecommunications network using a network connection. Through network interface 116, it is contemplated that the CPU 102 might receive information, e.g., data objects or program instructions, from another network, or might output information to another network in the course of performing the above-described method steps. Information, often represented as a sequence of instructions to be executed on a CPU, such as CPU 102, may be received from and outputted to another network, for example, in the form of a computer data signal embodied in a carrier wave. An interface card or similar device and appropriate software implemented by CPU 102 may be used to connect computer system 100 to an external network and transfer data according to standard protocols. That is, method embodiments of the present invention may execute solely upon CPU 102, or may be performed across a network such as the Internet, intranet networks, or local area networks, in conjunction with a remote CPU that shares a portion of the processing. Additional mass storage devices (not shown) may also be connected to CPU 102 through network interface 116.

An auxiliary I/O device interface (not shown) may also be used in conjunction with computer system 100. Such an auxiliary I/O device interface may include general and customized interfaces that allow CPU 102 to send and, more typically, receive data from other devices such as microphones, touch-sensitive displays, transducer card readers, tape readers, voice or handwriting recognizers, biometrics readers, cameras, portable mass storage devices, and other computers.

In addition, embodiments of the present invention further relate to computer storage products with a computer readable medium that contain program code for performing various computer-implemented operations. The computer-readable medium is any data storage device that can store data which can thereafter be read by a computer system. The media and program code may be those specially designed and constructed for the purposes of the present invention, or they may be of the kind well known to those of ordinary skill in the computer software arts. Examples of computer-readable media generally include, but are not limited to, all the media mentioned above: magnetic media such as hard disks, floppy disks, and magnetic tape; optical media such as CD-ROM disks; magneto-optical media such as floptical disks; and specially configured hardware devices such as application-specific integrated circuits (ASICs), programmable logic devices (PLDs), and ROM and RAM devices. The computer-readable medium may also be distributed as a data signal embodied in a carrier wave over a network of coupled computer systems so that the computer-readable code is stored and executed in a distributed fashion. Examples of program code include both machine code, e.g., machine code as produced by a compiler, or files containing higher level code that may be executed using an interpreter.

It should be appreciated that the computer system shown in FIG. 1 is an example of a computer system suitable for use with the invention. In general, various other computer systems may also be suitable for use with the invention. Such computer systems may include additional or fewer subsystems. In addition, bus 114 is illustrative of any interconnection scheme serving to link the subsystems. Other computer architectures having different configurations of subsystems may also be utilized.

The present invention is a system and method for facilitating a global safepoint operation in a multithreaded computer system. According to an embodiment of the present invention, each thread keeps track of its safepoint regions by maintaining a variable which indicates a state, such as whether the current region of the thread is safe, unsafe, or transitional. In this manner, it can be determined whether a thread is currently in a safepoint region without first suspending the thread. When a thread is currently in a safepoint region, the thread can continue to operate while a global safepoint operation, such as a garbage collection process, is being performed. When the thread begins to transition out of the safe region, it moves into a transitional region. The transitional region automatically blocks the transition into the non-safe region to assure that the safepoint operation occurs in a safe region.

In one embodiment, one thread may begin a safepoint procedure after it acquires a safepoint lock. The safepoint lock is arranged to block other threads from attempting to perform the safepoint procedure at the same time. That is, only the thread which is in possession of the safepoint lock is allowed to begin a safepoint procedure, or operation. Prior to initiating a safepoint operation, the thread attempting to initiate the safepoint operation will wait until all other threads reach a safe region in their own associated code.

Figure 2:
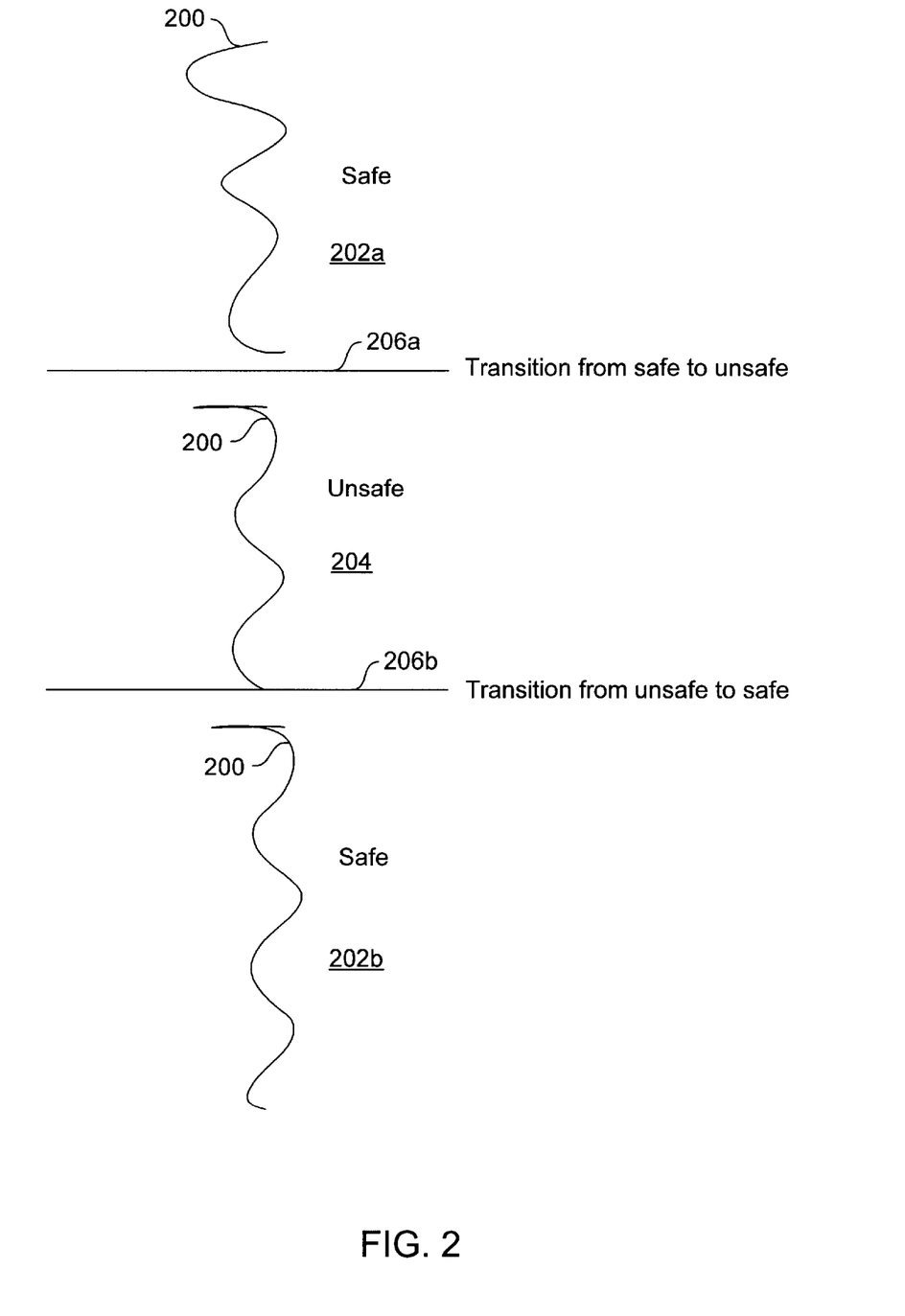
FIG. 2 is an illustration of a thread transitioning through safe and unsafe regions of computer code.

With reference to FIG. 2, the transitioning of a thread between safe and unsafe regions of computer code will be described. FIG. 2 is a diagrammatic representation of a thread that is transitioning between safe and unsafe regions of a computer code. Specifically, a thread 200 is shown in transition from a safe region 202a of computer code to an unsafe region 204 of computer code via a transition region 206a. Transition region 206a represents a transition from safe region 202a to unsafe region 204. Thread 200 is also shown to transition from unsafe region 204 to a safe region 202b via a transition region 206b.

If thread 200 is in a safe region, such as safe regions 202a and 202b, a global safepoint operation, such as garbage collection, may proceed while thread 200 continues to operate. When thread 200 reaches transition region 206a, and attempts to transition from safe region 202a to unsafe region 204, thread 200 may be blocked from continuing into unsafe region 204 to insure that thread 200 stays in safe region 202a during the global safepoint operation.

In the described embodiment, if thread 200 is in unsafe region 204, then thread 200 is allowed to continue through unsafe region 204, and the global safepoint operation is not initiated. As previously mentioned, an unsafe region is a region of code that allow pointers to be manipulated while a thread is effectively passing through the unsafe region. Examples of unsafe regions include virtual machine code, Java™ code, and code which is not identifiable. The Java™ code may generally include compiled code as well as interpreted code.

When thread 200 enters the transition region 206b, and, therefore, transitions from unsafe region 204 to safe region 202b, a waiting counter is decremented. Further details of the waiting counter will be discussed below with reference to FIG. 3.

Figure 3:
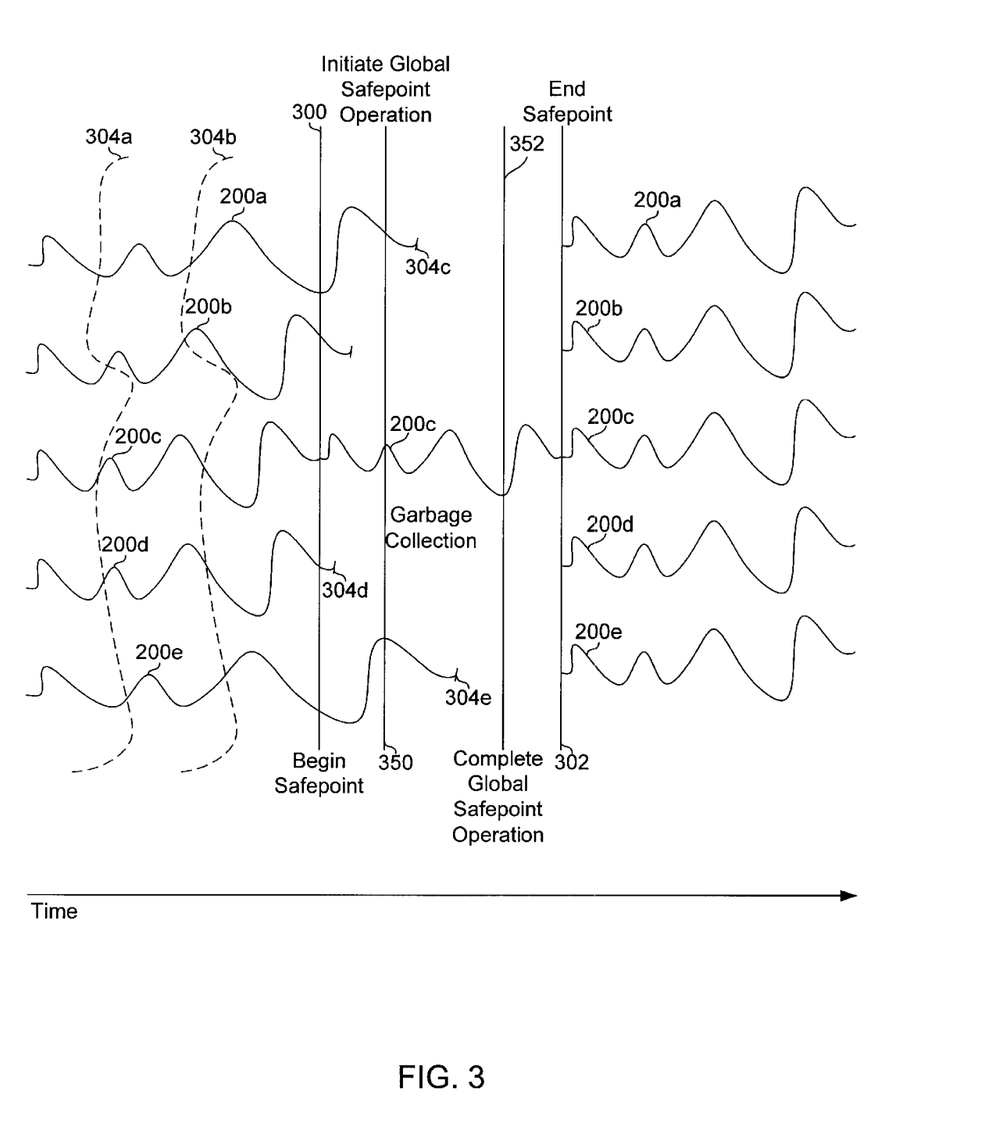
FIG. 3 is a diagrammatic illustration of threads progressing through a global safepoint operation in accordance with an embodiment of the present invention.

In general, in a multithreaded system, a group of threads may progress through a global safepoint operation. FIG. 3 is an illustration of a set of threads progressing through a global safepoint operation according to an embodiment of the present invention. As shown, each thread of a set of threads 200a–e progresses over time through its own associated set of computer code. Points 304a and 304b represent state transitions for each thread 200a–e. By way of example, point 304a for thread 200a may represent a transition from a safe region of computer code to an unsafe region of computer code, while point 304a for thread 200b may represent a transition from an unsafe region of computer code to a safe region of computer code. Likewise, point 304b for thread 200d may be representative of a transition from an unsafe region to a safe region, while point 304b for thread 200e may be representative of a transition from a safe region to an unsafe region.

In the described embodiment, a global safepoint operation, such as a garbage collection operation, is to be performed for thread 200c. The global safepoint operation is typically expected to be programmed such that the global safepoint operation itself is embodied in code that is considered to be a safe region of code. Accordingly, when thread 200c initiates a "begin safepoint" 300, an assumption may be made that thread 200c is moving through a safe region of code. Thus, it should not be necessary to perform a check regarding the current state of a state flag associated with thread 200c.

Thread 200c then acquires a safepoint lock at begin safepoint 300. Since thread 200c is the thread which initiates the safepoint operation, thread 200c may be referred to as the initiating thread. The safepoint lock ensures that thread 200c is the only thread allowed to perform the global safepoint operation, thus avoiding simultaneous attempts at performing global safepoint operations by different threads. Additionally, since remaining threads 200a, 200b, 200d, and 200e cannot acquire the safepoint lock, an attempt to acquire the safepoint lock by remaining threads 200a, 200b, 200d, and 200e will block further progress by these threads. Hence, when remaining threads 200a, 200b, 200d, and 200e move into a transition region from a safe region, they may be blocked from progressing from the transition region and into an unsafe region. In general, the blocking of progress by remaining threads may be implemented by causing the remaining threads to attempt to acquire the safepoint lock from an initiating thread before being allowed to progress into an unsafe region.

After acquiring the safepoint lock, thread 200c then waits until every other thread 200a, 200b, 200d, and 200e, has reached a safe region within its associated code. When a remaining thread 200a, 200b, 200d, and 200e transitions from an unsafe region, e.g., region 204 of FIG. 2, to a safe region, e.g., region 202b of FIG. 2, a waiting counter is decremented to indicate that the particular thread is one less thread for thread 200c to wait upon. In other words, the waiting counter is altered to provide an indication of how many remaining threads 200a, 200b, 200d, and 200e have not yet transitioned to a safe region. In the described embodiment, if any of remaining threads 200a, 200b, 200d, 200e are in safe regions, they are allowed to continue to progress until all of remaining threads 200a, 200b, 200d, 200e enter into a transition region that represents a transition from a safe region to an unsafe region. When a remaining thread 200a, 200b, 200d, 200e moves into such a transition, it is blocked to keep it from progressing out of the safe region and into an unsafe region. Once all threads 200a–200e are in safe regions, or are blocked at transitions from a safe region to an unsafe region, then the global safepoint operation, such as garbage collection, may be initiated.

For example, an assumption may be made that at point 304b, thread 200a transitions into a safe region. Once thread 200a has transitioned into a safe region, thread 200a may continue to operate after begin safepoint 300 until it reaches a transition state 304c. When begin safepoint 300 is initiated, the state flag associated with thread 200a will generally be checked to determine the type of region thread 200a is moving through. In this example, the state flag associated with thread 200a state flag will indicate that thread 200a is in a safe region. At transition state 304c, thread 200a will be blocked to ensure that it does not move into an unsafe region during the global safepoint operation.

In another example, an assumption may be made that thread 200b transitions into an unsafe region at point 304b. When begin safepoint 300 is initiated, the state flag associated with thread 200b is typically checked to determine what type of region thread 200b is moving through. In the embodiment as shown, the state flag associated with thread 200b will indicate that thread 200b is in an unsafe region. Thread 200b is then suspended and handled such that a safepoint operation may be performed. Further details of unsafe region handling will later be discussed below in conjunction with FIGS. 7A–7E.

If thread 200d is in a transition from a safe region to an unsafe region at the time the state flag associated with thread 200d is checked after begin safepoint 300 is initiated, then the progress of thread 200d is blocked to prevent thread 200d from moving into an unsafe region. If thread 200e is in a transition from an unsafe region to a safe region at the time the state flag associated with thread 200d is checked (after begin safepoint 300 is initiated), then thread 200e is allowed to continue its progress. If thread 200e reaches another transition state that is indicative of a transition into an unsafe region, then thread 200e is blocked from progressing at point 304e.

When all threads 200a–200e are in safe regions, then, in the described embodiment, the global safepoint operation may be initiated at point 350 by initiating thread 200c, e.g., the thread which possesses the safepoint lock. When the global safepoint operation is completed at point 352, a variable may be set such that threads 200a–200e are no longer blocked at transitions. In one embodiment, the variable may be set by the global safepoint operation, although the variable may also be set by the initiating thread, i.e., initiating thread 200c. When the global safepoint operation is completed, the safepoint lock is typically released by initiating thread 200c, and any threads which were suspended are unsuspended. Once all previously suspended threads are unsuspended, the threads are allowed to continue and complete their operations, or tasks. After the threads continue, or otherwise resume, and complete their operations, the overall safepoint procedure is completed at point 302.

Figure 4:
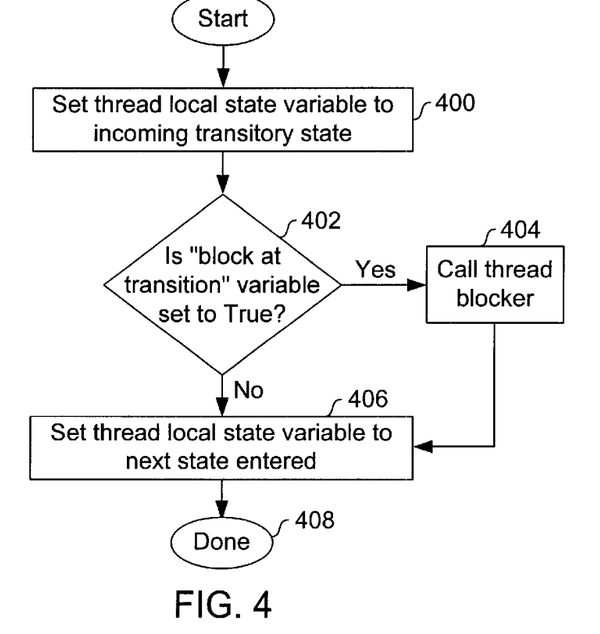
FIG. 4 is a process flow diagram of a transition within a thread in accordance with an embodiment of the present invention.
Figure 5:
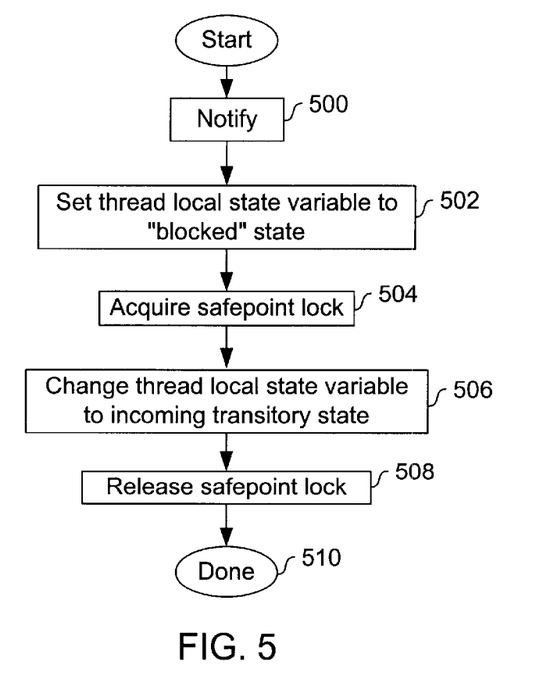
FIG. 5 is a process flow diagram of a method for blocking a thread in accordance with an embodiment of the present invention.
Figure 6:
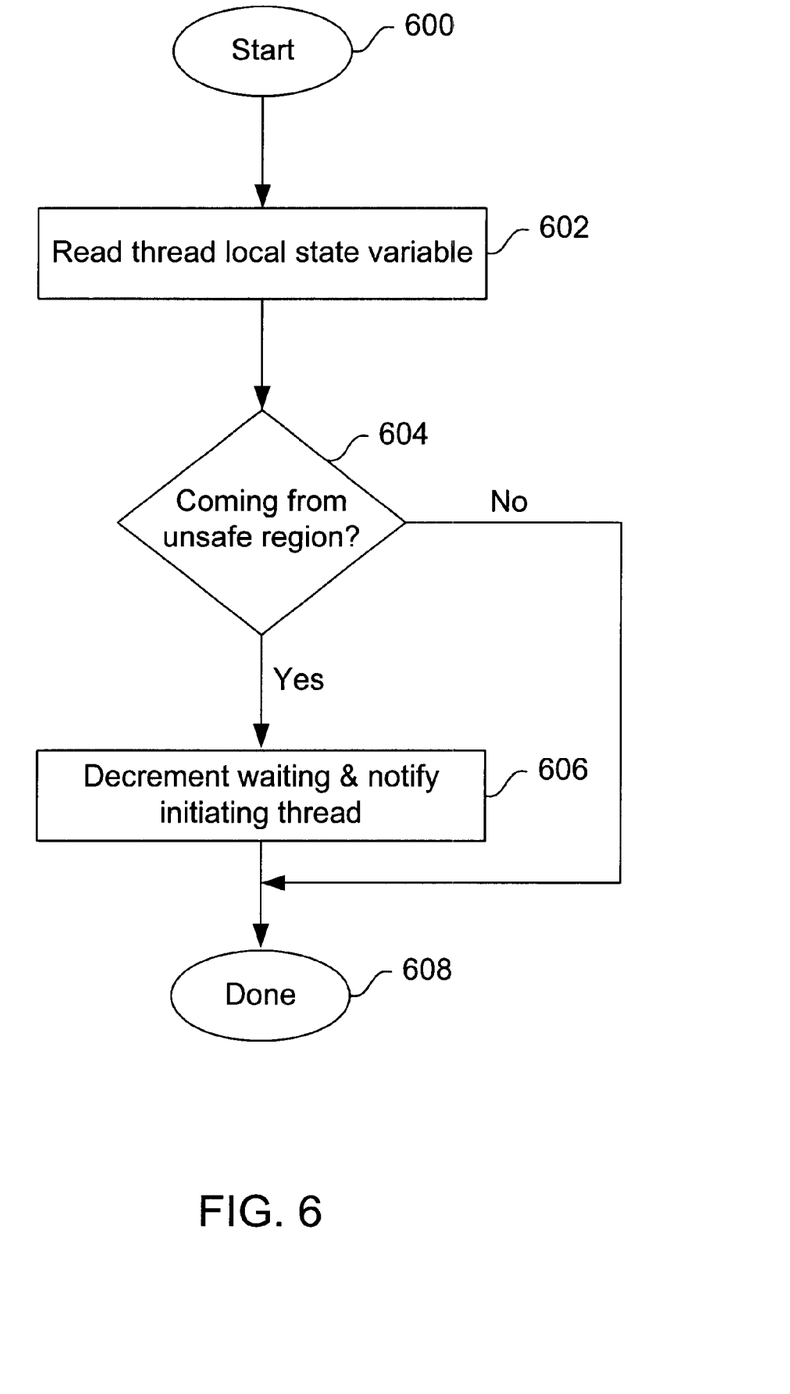
FIG. 6 is a process flow diagram of a method for implementing a notify block in accordance with an embodiment of the present invention.

In general, different events occur for each thread at checkpoints 304a–304e. With reference to FIGS. 4 through 6, the events which may occur for threads at checkpoints, e.g., threads at checkpoints 304a–304e of FIG. 3, will be described in accordance with an embodiment of the present invention. Similarly, various events may occur at begin and end safepoints such as begin and end safepoints 300 and 302 of FIG. 3. Events which may occur at begin and end safepoints 300 and 302 of FIG. 3 will be discussed below with reference to FIGS. 7A–7E.

FIG. 4 is a process flow diagram which illustrates the steps associated with a transition between program code regions within a thread according to an embodiment of the present invention. A thread local state variable is set to an incoming transitory state in step 400. The thread local state variable may be a flag that is arranged to indicate the state of the region through which the thread is passing. By way of example, if a thread was transitioning from a safe region to an unsafe region, the transition region may be identified by setting the thread local state variable to a value to indicate that the thread is in a transition from a safe region to an unsafe region. The thread local state variable may also be set to different values in order to indicate that the thread is in a safe region, an unsafe region, or a transition from an unsafe region to a safe region.

After the thread local state variable is set, it is in step 402 determined whether a variable, called a "block at transition" variable, is set to true. The "block at transition" variable is arranged to indicate whether a thread should be blocked at a transition region. In other words, the "block at transition" variable provides an indication of whether a thread should be prevented from passing into and through a transition region.

It should be noted that a thread block is simpler and easier to perform than a thread suspend. When a thread is blocked, it simply does not proceed on to the next state or region, whereas when a thread is suspended, the operating system typically must perform the suspend operation. A suspend operation generally uses system resources and, in addition, takes at least some time to perform. In addition, a suspend operation may be somewhat complicated, as will be appreciated by those skilled in the art. Accordingly, it is simpler and less expensive to block a thread than to suspend the thread.

If it is determined that the "block at transition" variable is set to true in step 402, then a thread blocker is called in step 404. The steps associated with a call to the thread blocker will be discussed later with reference to FIG. 5. Once the thread blocker is called, the thread local state variable is set to the next state which is to be entered by the thread in step 406. After the thread local state variable is set in step 406, then the transition is considered to be completed at step 408.

Alternatively, if the "block at transition" variable is not set to true in step 402, then the indication is that the thread is not to be blocked. Hence, the thread local state variable is set to the next state that is to be entered by the thread in step 406, and the transition is completed in step 408.

As mentioned above, when a thread is blocked, the thread does not proceed from a current state to the next state. In order to cause a thread to be blocked, a thread blocker may be called. FIG. 5 is a process flow diagram which illustrates the steps associated with a method for blocking a thread according to an embodiment of the present invention. That is, FIG. 5 is a process flow diagram which illustrates the steps associated with a call to a thread blocker, i.e., step 404 of FIG. 4. The process begins at step 500 in which a notify block is implemented. Details of the implementation of the notify block will be discussed below with respect to FIG. 6.

From step 500, process flow proceeds to step 502 where the thread local state variable associated with the thread that is to be blocked is set to a "blocked" state. Herein and below, the thread that is to be blocked may be referred to as a "current" thread or a "target" thread. After the thread local state variable associated with the current thread is set to a blocked state, a safepoint lock is then acquired by the thread in step 504. In the event that the safepoint lock may not be immediately acquired, e.g., because the initiating thread has already acquired it, the current thread waits until the safepoint lock is available to be acquired. The safepoint lock may only be acquired after the thread holding the safepoint lock releases it. Waiting to acquire the safepoint lock keeps the current thread in a "blocked" state by holding its position, thereby effectively preventing the thread from executing, until the safepoint lock is acquired. The "blocked" state indicates to the initiating thread that the current thread is in a safe region. Since the thread holding the safepoint lock will not release the safepoint lock until the global safepoint operation is completed, the current thread, or the thread in the "blocked" state, is blocked throughout the global safepoint operation by waiting to acquire the safepoint lock.

The acquisition of a safepoint lock allows the initiating thread, such as thread 200c of FIG. 3, to progress beyond the begin safepoint 300 and, hence, have the desired safepoint operation executed, without the other, remaining threads 200a, 200b, 200d, and 200e accessing and interfering with the safepoint operation. Once the safepoint lock has been acquired in step 504, the thread local state variable of the current thread is then changed to the incoming transitory state in step 506. In this manner, the safepoint lock may be acquired by each thread, one at a time, and each thread is allowed to move forward, e.g., transition into the next state. The safepoint lock is then released by the thread in step 508, and the call to the thread blocker is completed in step 510.

FIG. 6 is a process flow diagram of the implementation of a notify block, such as the implementation of notify block 500 of FIG. 5, in accordance with an embodiment of the present invention. The notify block begins at step 600, and the thread local state variable associated with the current thread, or the thread being "processed," is read in step 602. It is then determined in step 604 whether this thread is transitioning from, or out of, an unsafe region. If the determination is that the thread is not coming from an unsafe region, then the processing of the notify block is completed in step 608. If, however, it is determined that the thread is coming from an unsafe region in step 604, then a waiting counter is decremented to notify the initiating thread that it is unnecessary for the initiating thread to wait for this particular thread, i.e., the current thread, to enter a safe region in step 606. Thereafter, the processing of the notify block is completed in step 608.

The steps associated with safepoint synchronization may generally be widely varied depending upon the requirements of a particular system. With reference to FIGS. 7A–7E, one method of safepoint synchronization will be described in accordance with an embodiment of the present invention. FIGS. 7A–7E represent events which occur during and between begin safepoint 300 and end safepoint 302 of FIG. 3.

Figure 7A:
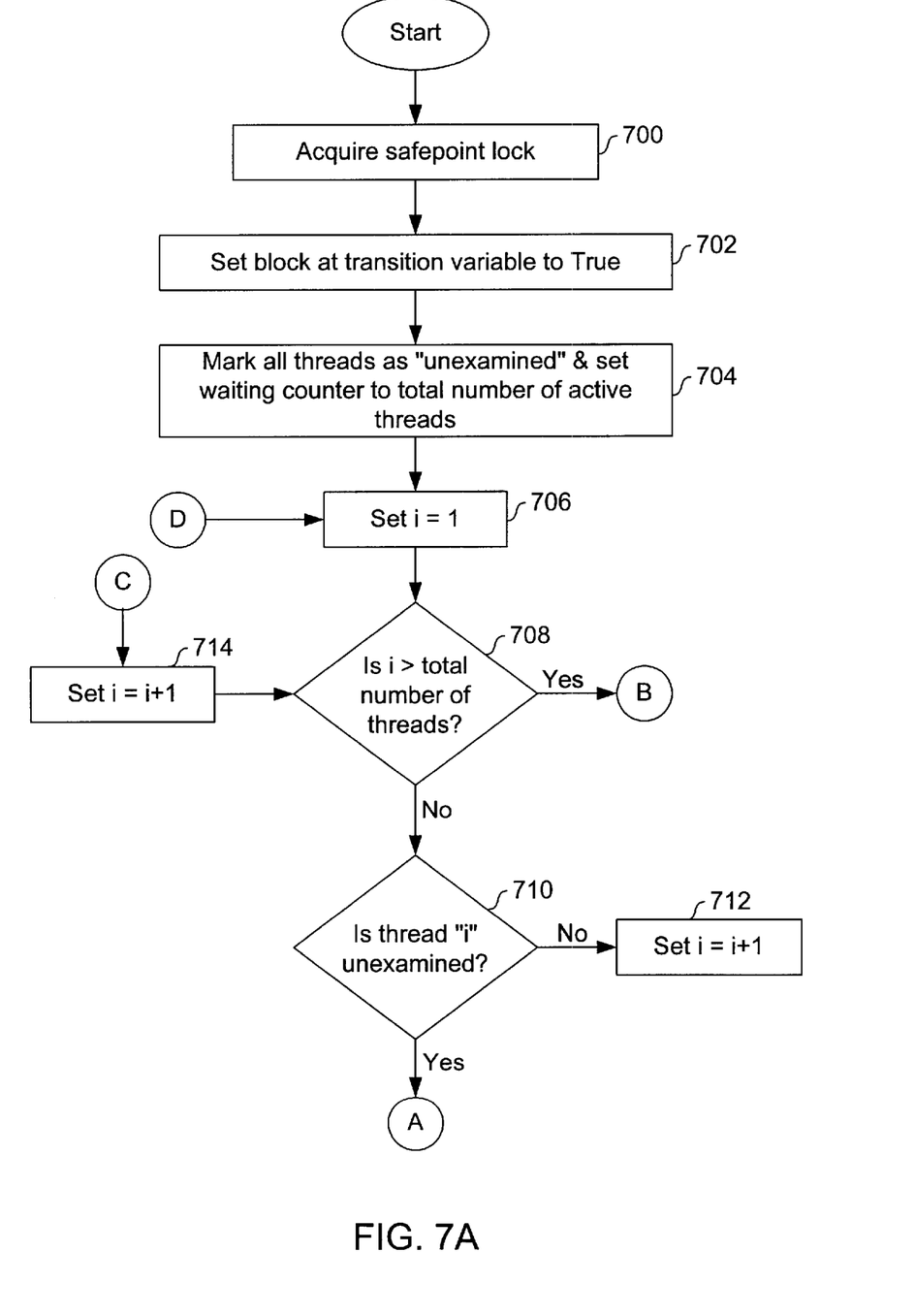
FIGS. 7A–7E are a process flow diagram of a method for safepoint synchronization in accordance with an embodiment of the present invention.

With reference to FIG. 7A, a safepoint lock is acquired by a thread in step 700. Once the safepoint lock is acquired, a "block at transition" variable is set to true in step 702. As previously described, setting the "block at transition" variable to true provides an indication that a thread should be blocked at a transition region. All threads are marked as "unexamined," and a waiting counter is set to equal the total number of active threads in step 704. A variable "i" is set equal to 1 in step 706, wherein "i" indicates a particular thread. In other words, a variable "i" is initiated in step 706.

Figure 7B:
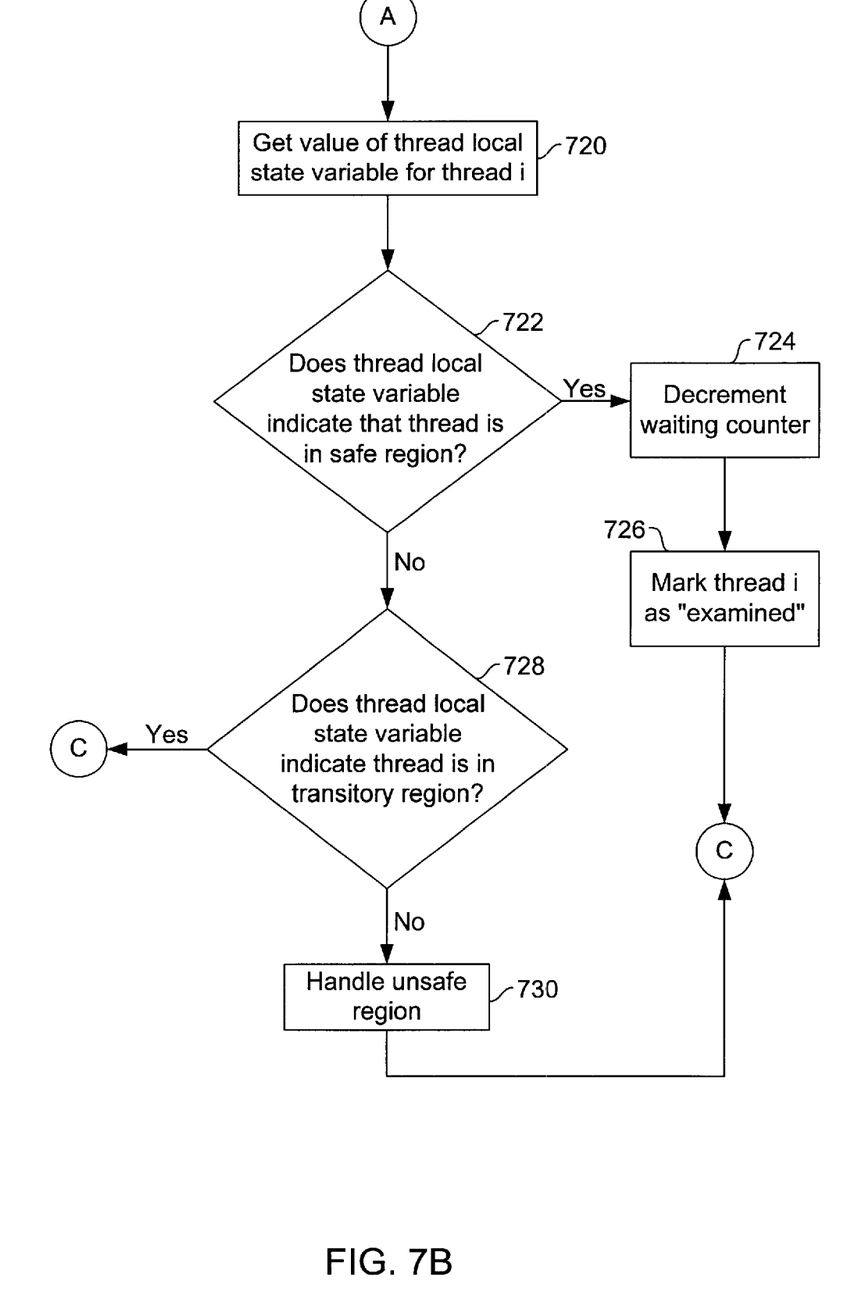
Figure 7C:
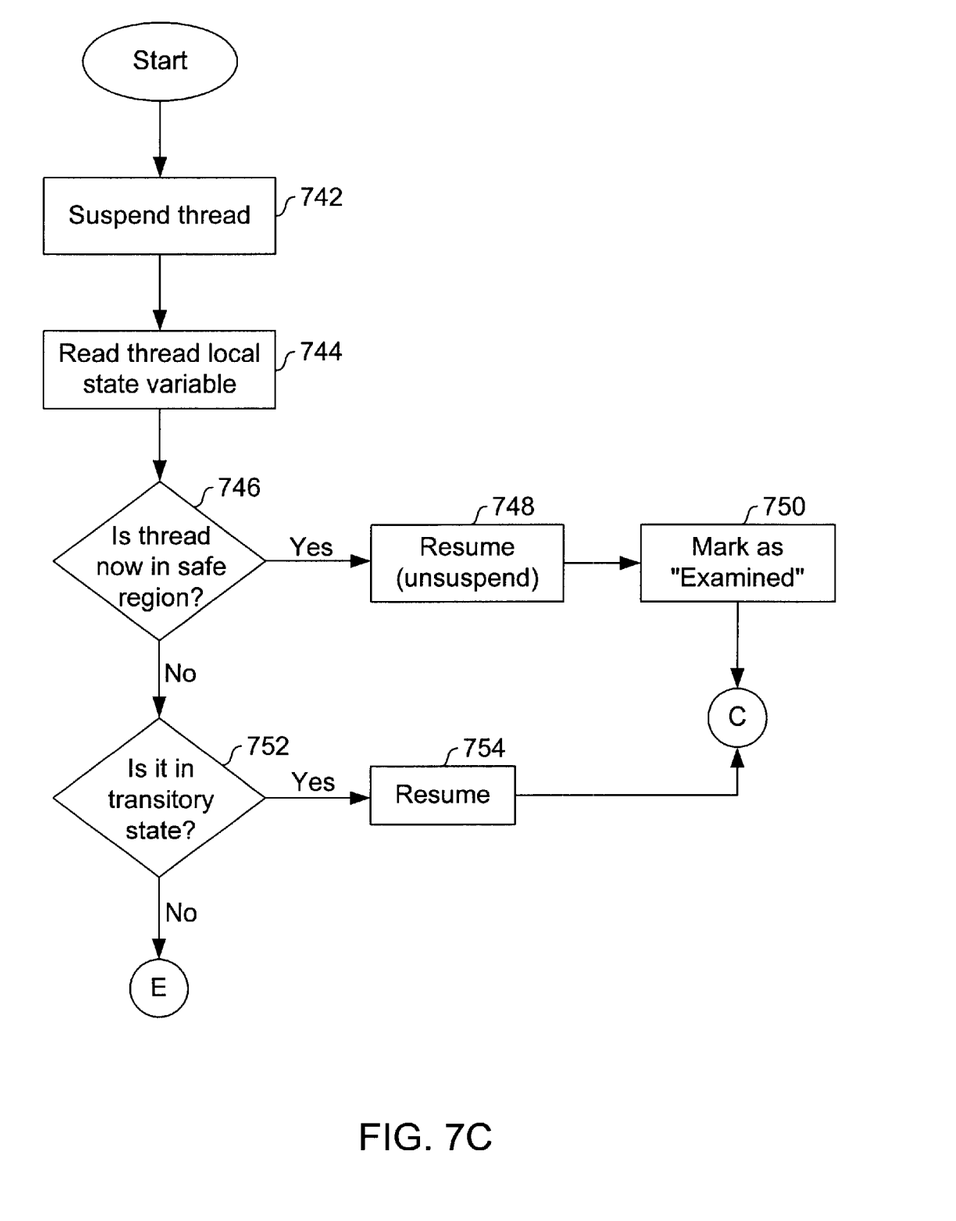
Figure 7D:
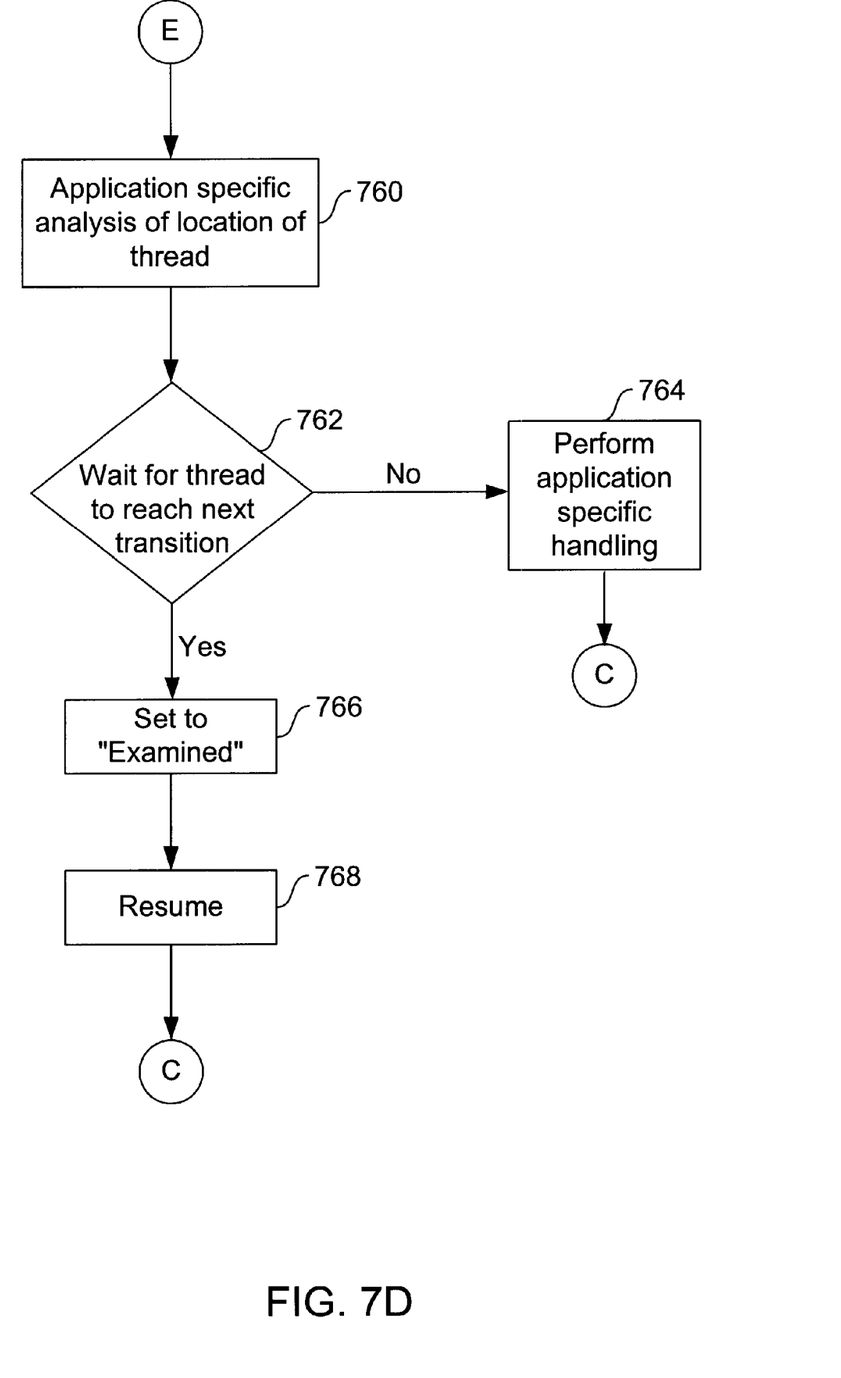
Figure 7E:
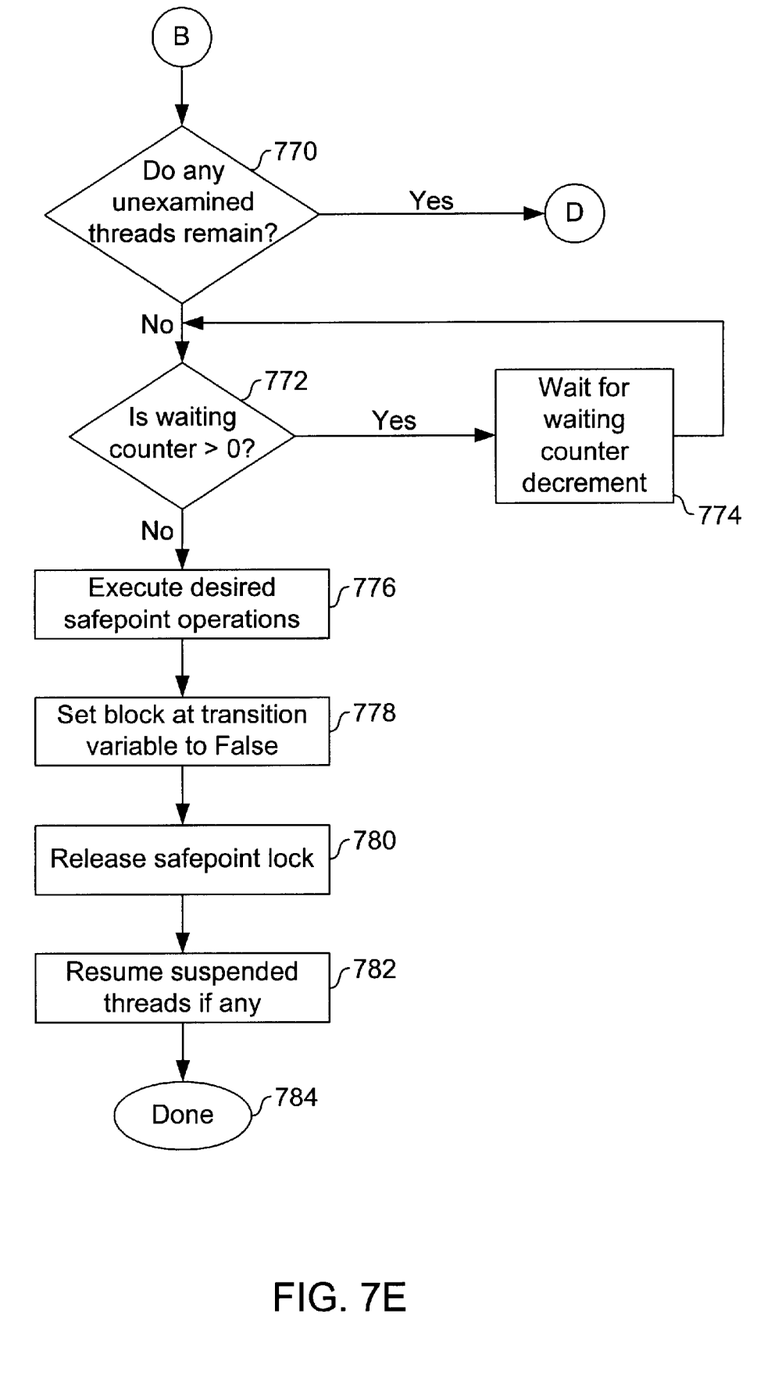

From step 706, process flow moves to step 708 where it is determined whether "i" exceeds the total number of threads, which may be expressed as "N." If the determination is that "i" does exceed the total number of threads in step 708, then the flow diagram shown in FIG. 7E is referenced, as indicated at point B. That is, process flow then moves from step 708 to step 770 of FIG. 7E, as will be discussed below.

Alternatively, when it is determined in step 708 that "i" does not exceed the total number of threads, then the indication in the described embodiment is that "i" is less than or equal to the total number of threads. It is determined whether thread "i" is unexamined in step 710. If thread "i" is not unexamined in step 710, then "i" is set equal to "i"+1 instep 712. In other words, "i" is incremented. Once "i" is incremented, process flow loops back to step 708 in which it is again determined whether "i" equals the total number of threads.

If, however, it is determined that thread "i" is unexamined in step 710, then the flow diagram of FIG. 7B is referenced. That is, process flow proceeds from step 710 to step 720. The value of the thread local state variable for thread "i" is retrieved in step 720. As discussed above, the thread local state variable for thread "i" may be a flag that indicates a state of the region through which thread "i" is running. A flag, as will be appreciated by those skilled in the art, is typically a variable, or a number of bits, which may be set to different values. Once the thread local state variable for thread "i" is set, it is then determined in step 722 whether the thread local state variable indicates that thread "i" is in a safe region. If thread "i" is in a safe region in step 722, then the waiting counter is decremented in step 724, and thread "i" is marked as "examined" in step 726. After thread "i" is marked as examined, process flow returns to step 714 in which "i" is incremented, i.e., "i" is set to "i"+1. Thereafter, it is again determined whether "i" equals the total number of threads in step 708.

Returning to step 722, if the thread local state variable indicates that thread "i" is not in a safe region, then a determination is made in step 728 as to whether the thread local state variable indicates that thread "i" is in a transitory region. If thread "i" is in a transitory region in step 728, then "i" is set equal to "i"+1 in step 714. If, however, thread "i" is not in a transitory region in step 728, then the unsafe region is handled in step 730. The handling of an unsafe region will later be discussed in conjunction with FIG. 7C. Once the unsafe region is handled, process flow returns to step 714 where "i" is set equal to "i"+1.

Referring next to FIGS. 7C and 7D, the handling of unsafe regions, e.g., step 730 of FIG. 7B, will be described according to an embodiment of the present invention. The thread that is in an unsafe region is suspended in step 742, as for example by a call to an associated operating system. The thread local state variable of thread "i" is then read in step 744. Although the thread is initially in an unsafe region when the suspension of the thread is initiated, the thread may have moved into a safe region by the time the execution of the thread suspend is complete. Accordingly, the thread local state variable may be checked again in step 744, and a determination may be made in step 746 regarding whether the thread is now in a safe region. If the thread is now in a safe region in step 746, then the thread is resumed, i.e., unsuspended, in step 748. The thread is then marked as "examined" in step 750. After the thread is marked as "examined, FIG. 7A is again referenced at point C, and "i" is set equal to "i"+1 in step 714.

If the determination in step 746 is that thread "i" is still not in a safe region, then it is determined whether thread "i" is in a transitory state in step 752. If it is determined that thread "i" is in an transitory state in step 752, thread "i" is resumed, or unsuspended, in step 754. It should be appreciated that in the described embodiment, thread "i" is not marked as "examined." Instead, thread "i" is later reexamined to determine if it is in a safe region. From step 754, process flow returns to step 714 of FIG. 7A, in which "i" is set equal to "i"+1.

When it is determined in step 752 that thread "i" is not in a transitory state, then process flow proceeds to step 760 of FIG. 7D. An application-specific analysis of the location of the thread, i.e., thread "i," is performed in step 760. The application-specific analysis is user-configurable, or programmer-configurable, depending on the application code through which the thread is running. In the example shown in FIG. 7D, it is assumed that the application through which the thread is running is an unsafe region of interpreted code. For the example of the interpreted code, the application-specific analysis may be such that although the thread is running through an unsafe region, the thread may be allowed to continue to run since it may be assumed that the interpreted code will contain calls back to safe regions.

After the application-specific analysis of the location of the thread is completed, it is then determined whether to wait for the thread to reach the next transition in step 762. In one embodiment, this determination may be made depending on the application-specific analysis. For instance, if the unsafe region is in a region of interpreted code, then according to the present example, a determination may be made regarding whether to wait for the thread to reach the next transition.

If it is determined not to wait for the thread to reach the next transition in step 762, then an application-specific handling is performed in step 764. An example of application-specific handling includes a situation in which there are "microsafe regions" within an unsafe region. Microsafe regions are typically pockets, e.g., relatively small pockets, of safe regions that are located within an overall unsafe region. Microsafe regions indicate finer grained transitions than those which might be applied to other regions. These microsafe regions may have explicit checks indicating transitions, e.g., transitional regions. By way of example, if the unsafe region is in compiled code, then a programmer may prefer to use microtransitions to indicate microsafe regions within an unsafe region. If the thread is in a microsafe region within the compiled code, then user preference may be to procede ahead a few instructions until the thread reaches a microsafe region. Once a microsafe region is reached by a thread, this thread may be safe for a global safepoint operation.

If the determination in step 762 is to wait for the thread to reach the next transition then thread "i" is set to "examined" in step 766. After thread "i" is set to "examined," the progress of the thread is resumed unsuspended in step 768. From step 768, process flow then moves to step 714 of FIG. 7A, where "i" is set equal to "i"+1 and the next thread is examined. It should be noted that the waiting counter is generally not decremented when a thread is found to be in an unsafe region. When the thread reaches a transition from an unsafe region to a safe region, then the waiting counter will be decremented and the initiating thread will be notified, such as in step 606 of FIG. 6.

FIG. 7E is referenced when it is determined that "i" equals the total number of threads in step 708 of FIG. 7A. If "i" equals the total number of threads in step 708, then it a determination is made regarding whether any unexamined threads remain in step 770. If any unexamined threads remain, then FIG. 7A is referenced at point D, and "i" is set equal to zero in step 706.

Alternatively, if there are no unexamined threads remaining in step 770, then it is determined whether the waiting counter is greater than zero in step 772. If the waiting counter is determined to be greater than zero, then there is a wait for the waiting counter to decrement in step 774. As previously mentioned in conjunction with FIGS. 3 and 6, the waiting counter decrements when any of the threads moves through a transition region indicating a transition from an unsafe region to a safe region. After the waiting counter decrements, process flow loops back to step 772 in which it is again determined whether the waiting counter is greater than the zero.

When the waiting counter is determined to not be greater than zero in step 772, then the indication is that all of the threads have been examined and are in safe regions. Accordingly, the desired global safepoint operation, such as garbage collection, may be executed in step 776. After the global safepoint operation is completed, the "block at transition" variable is then set to false to permit threads to move beyond transition regions and into unsafe regions in step 778. The safepoint lock is also released to permit another thread to obtain the safepoint lock in step 780. Finally, any suspended threads are resumed, or unsuspended, in step 782. Once the suspended threads, if any, are resumed, then the process of safepoint synchronization is completed at step 784.

A method and system for facilitating safepoint synchronization in a multithreaded computer system environment has generally been disclosed. Software written according to the present invention may be stored in some form of computer-readable medium, such as memory or CD-ROM, or transmitted over a network, and executed by a processor.

Although the present invention has been described in accordance with the embodiment shown, one of ordinary skill in the art will readily recognize that there could be variations to the embodiment and these variations would be within the spirit and scope of the present invention. For example, the flow diagrams shown in FIGS. 4 through 7E are merely examples of an embodiment of the present invention. There may be variations in the steps shown as well as the order of the steps shown. By way of example, steps may generally be altered, reordered, added, and removed. In addition, safepoint operations may include any number of different operations in addition to garbage collection. Accordingly, many modifications may be made by one of ordinary skill in the art without departing from the spirit and scope of the appended claims.

What is claimed is:

1. A method for facilitating a safepoint operation in a multi-threaded computer system, the method comprising:

acquiring a lock using a first thread, the first thread being one of a plurality of threads associated with the multi-threaded computer system;

determining whether a second thread selected from the plurality of threads is in a safe region, without suspending the second thread;

initiating a safepoint operation; and determining, when the second thread transitions out of a safe region, whether a safepoint operation has been initiated, without suspending the second thread.

2. A method as recited in claim 1 wherein when it is determined that the second thread is in a safe region, the second thread is permitted to run when the safepoint operation is initiated.

3. The method of claim 1, further including:

blocking the second thread when it is determined that a safepoint operation has been initiated.

4. The method of claim 3, wherein the second thread is blocked by attempting to acquire the lock during a time when the first thread has already acquired the lock.

5. The method of claim 1, wherein the initiated safepoint operation includes a memory reallocation operation.

6. The method of claim 5, wherein the memory reallocation operation is a garbage collection operation.

7. A method for facilitating a safepoint operation in a multi-threaded computer system, the method comprising:

determining whether a selected thread is in a safe region, the determination being made without suspending the selected thread;

continuing thread operation when the selected thread is in the safe region;

initiating a safepoint operation while the selected thread is continuing to operate; and determining, when the selected thread transitions out of a safe region, whether a safepoint operation has been initiated, without suspending the selected thread.

8. The method of claim 7, herein the selected thread is blocked when it is determined that a safepoint operation has been initiated.

9. The method of claim 7, wherein the selected thread is blocked from moving out of the safe region.

10. The method of claim 9, wherein the selected thread is blocked by requiring that the selected thread acquire a safepoint lock before moving out of the safe region.

11. The method of claim 7, further including suspending the selected thread if the thread is in an unsafe region.

12. The method of claim 7, further including continuing the selected thread operation when the selected thread is in a transition from an unsafe region to a safe region, and initiating the safepoint operation only when the selected thread is in a safe region.

13. The method of claim 7, further comprising blocking the thread operation when the selected thread is in a transition from a safe region to an unsafe region.

14. A system for facilitating a safepoint operation in a computer system comprising:

a lock acquiring mechanism for acquiring a safepoint lock by a safepoint operating thread;

a first determiner for determining when at least one of a plurality of threads is in a safe region, wherein the determination is made without suspending the at least one of the plurality of threads;

a second determiner for determining whether a safepoint operation has been initiated, wherein the determination is made without suspending the at least one of the plurality of threads;

a blocking mechanism integrated into the at least one of the plurality of threads, the blocking mechanism being capable of blocking the progress of the at least one of the plurality of threads when the second determiner determines that a safepoint operation has been initiated and when the at least one of the plurality of threads transitions out of a safe region; and an initiator for initiating a safepoint operation.

15. A computer program product for facilitating a safepoint operation in a computer system comprising:

computer code for acquiring a safepoint lock by a first thread, the first thread being one of a plurality of threads;

computer code for determining when at least one of the plurality of threads is in a safe region, wherein the determination is made without suspending the at least one of the plurality of threads;

computer code for initiating a safepoint operation;

computer code for determining, when the at least one of the plurality of threads transitions out of a safe region, whether a safepoint operation has been initiated, without suspending the at least one of the plurality of threads; and a computer readable medium that stores the computer codes.

16. The computer program product of claim 15, wherein the computer readable medium is selected from the group consisting of CD-ROM, floppy disk, tape, flash memory, system memory, hard drive, and data signal embodied in a carrier wave.

17. A method for facilitating a safepoint operation in a multi-threaded computer system, the method comprising:

acquiring a lock using a first thread, the first thread being one of a plurality of threads associated with the multi-threaded computer system;

determining whether a second thread selected from the plurality of threads is in a safe region;

determining whether the second thread is moving out of the safe region when it is determined that the second thread is in a safe region;

blocking the second thread when it is determined that the second thread is moving out of the safe region;

initiating a safepoint operation while the second thread is permitted to run when it is determined that the second thread is not moving out of the safe region; and determining, when the second thread moves out of a safe region, whether a safepoint operation has been initiated, without suspending the second thread.

18. A method for facilitating a safepoint operation as recited in claim 17 wherein initiating the safepoint operation includes initiating the safepoint operation while the second thread is blocked when it is determined that the second thread is moving out of the safe region.

19. A computer program product for facilitating a safepoint operation in a computer system including at least one thread, the computer program product comprising:

computer code for acquiring a safepoint lock by a first thread, the first thread being one of a plurality of threads;

computer code for determining when at least one of the plurality of threads is in a safe region;

computer code for initiating a safepoint operation without suspending the at least one of the plurality of threads, the initiation of a safepoint operation causing the at least one of the plurality of threads to be blocked if the at least one of the plurality of threads transitions out of the safe region; and a computer readable medium that stores the computer codes.

20. A system for facilitating a safepoint operation in a computer system, the computer system including a plurality of threads, the system comprising:

a lock acquiring mechanism for acquiring a safepoint lock by a first thread, the first thread being one of the plurality of threads;

a determiner for determining when at least one of the plurality of threads is in a safe region;

a second determiner for determining when a safepoint operation has been initiated, wherein the determination is made without suspending the at least one of the plurality of threads; and an initiator for initiating a safepoint operation without suspending the at least one of the plurality of threads.

21. A method for conducting a garbage collecting operation in a multi-threaded computer system, comprising:

providing a first thread that is capable of performing a garbage collection operation;

providing a second thread that is capable of being in a safe region, an unsafe region, and transitioning between the two regions;

initiating the garbage collection operation;

determining, as a response to the garbage collection initiation, which region the second thread is in without suspending the operation of the second thread;

performing the garbage collection process with the first thread without suspending the second thread if the second thread is determined to be in a safe region; and waiting to perform the garbage collection process with the first thread for as long as the second thread is determined to be in an unsafe region;

blocking the second thread if the second thread transitions out of the safe region while the garbage collection process is being performed; and determining, when the second thread moves out of a safe region, whether a garbage collection process has been initiated, without suspending the second thread.

22. The method of claim 21 further comprising:

initiating an unsafe region handling process while waiting to perform the garbage collection process.

23. The method of claim 21, further comprising decrementing a waiting counter when the state indicates a type of transition.

* * * * *